W. B. BEMIS.
APPARATUS FOR PREPARING BUTTER FOR PACKING.

No. 189,078. Patented April 3, 1877.

WITNESSES:
Chas. Nida
J. H. Scarborough

INVENTOR:
W. B. Bemis
BY
ATTORNEYS.

UNITED STATES PATENT OFFICE.

WARREN B. BEMIS, OF CINCINNATI, OHIO.

IMPROVEMENT IN APPARATUS FOR PREPARING BUTTER FOR PACKING.

Specification forming part of Letters Patent No. 189,078, dated April 3, 1877; application filed January 29, 1877.

*To all whom it may concern:*

Figure 1:
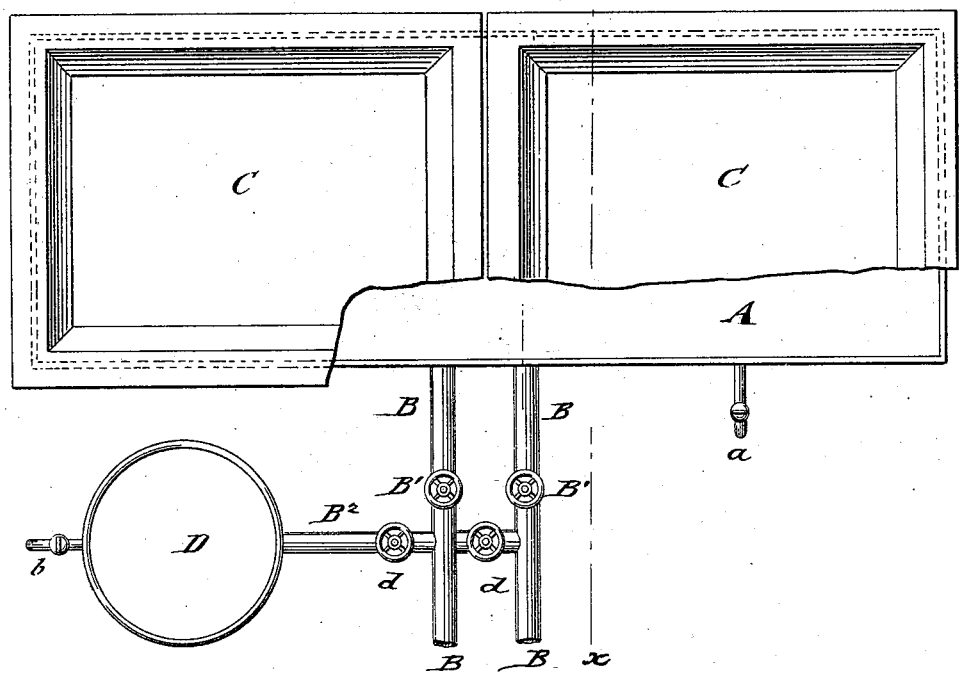
Figure 2:
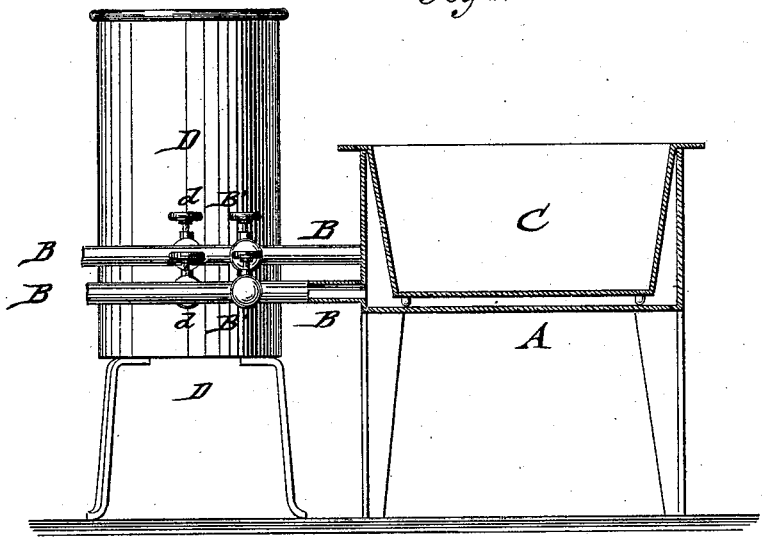

Be it known that I, WARREN B. BEMIS, of Cincinnati, in the county of Hamilton and State of Ohio, have invented a new and Improved Apparatus for Preparing Butter for Packing, of which the following is a specification:

In the accompanying drawing, Figure 1 represents a top view, and Fig. 2 a vertical transverse section on line $x\ x$, Fig. 1, of my improved apparatus for preparing butter for packing.

Similar letters of reference indicate corresponding parts.

This invention is intended to provide an improved apparatus for heating up and softening butter preparatory to being packed, so that the packing may be accomplished in a manner less injurious to the quality of the butter, with less hardship to the men employed, and in a quicker and more uniform manner.

The usual way of softening butter for packing is to put it in a room that is heated by a fire to a temperature of from 80° to 100°, which takes from three to five hours to make the butter soft enough for work. Even then the butter is not uniformly softened, as some of it remains hard, while some is melted to oil, which is injurious to the quality of the butter. My invention obviates this defective feature; and consists of pans for holding butter heated by a water-bath, connected with a regulating water-tank, for taking up the excess of heat and hot water.

In the drawing, A represents a tank with entrance and exit pipes B for the steam or hot water, and valves $B^1$ for admitting and shutting off the heat. The tank forms the water-bath for the pans C, into which the butter is placed for being softened. The tank is provided with a faucet, $a$, for drawing off the collecting water, and the pipes B are connected with a water-tank, D, having a similar discharge-faucet, $b$. The water-tank connecting pipe-sections $B^2$ have also valves $d$, which may be opened or closed, as required, the water in the tank serving to take up the excess of heat and hot water when the main valves $B^1$ are shut off.

The pans are heated up to about 70° of heat, and the butter is then placed therein, the workmen cutting up the rolls with ladles to expose the butter uniformly to the heat. In from twenty to thirty minutes the butter is soft enough to be worked easily by hand with the ladle, the heat of the water-bath producing thus about the same effect as the change of temperature from a cold to a warm day. The heat, however, is not sufficient to melt the butter so as to injure the same. Should the bath get too hot, the current of steam or hot water is shut off and conducted into the regulating-tank.

In this manner the softening of the butter is accelerated, and the packing accomplished in a more perfect manner.

Having thus described my invention, I claim as new and desire to secure by Letters Patent—

The combination, with butter-pan C, of the tank A, connected by valved pipes with a hot and cold water reservoir, as shown and described, so that the temperature of the heating-fluid may be regulated as desired.

WARREN B. BEMIS.

Witnesses:
 ALBION J. MILLER,
 FRANK O. WOOD.